United States Patent

[11] 3,616,110

| [72] | Inventors | Louis F. Kutik<br>8720 S.W. 23rd Pl., Fort Lauderdale, Fla. 33314;<br>Erich W. Gronemeyer, 3430 Galt Ocean Drive, Fort Lauderdale, Fla. 33308 |
|---|---|---|
| [21] | Appl. No. | 729,694 |
| [22] | Filed | May 16, 1968 |
| [45] | Patented | Oct. 26, 1971 |

[54] PROGRESSIVE INJECTION MOLDED SHEET AND METHOD OF AND APPARATUS FOR MAKING THE SAME
8 Claims, 16 Drawing Figs.

[52] U.S. Cl. .................................................. 161/37,
161/44, 156/304, 161/123, 161/67
[51] Int. Cl. .................................................. B32b 3/10,
D03d 27/00, B29c 19/00
[50] Field of Search .......................................... 161/36–38,
44, 123.67; 264/171–172, 248; 156/304, 306

[56] References Cited
UNITED STATES PATENTS

| 1,685,423 | 9/1928 | Hurlburt ...................... | 156/304 |
| 2,388,297 | 11/1945 | Slaughter ...................... | 156/304 |
| 1,271,005 | 7/1918 | Bartlett ........................ | 161/44 |
| 2,590,032 | 3/1952 | Petry ............................ | 161/36 |
| 3,114,940 | 12/1963 | Rockabrand et al. ......... | 161/123 |
| 3,455,076 | 7/1969 | Clavoe ......................... | 161/123 |

Primary Examiner—Douglas J. Drummond
Attorney—Settle, Batchelder & Oltman

ABSTRACT: A plastic sheet is disclosed which is made up of injection molded sections molded progressively and joined together at edges thereof during the molding process. The sheet may have integral bristles on one side thereof making it useful as a rug or carpet, but other uses of the invention are contemplated. The method includes the molding of plastic sections such that as each section after the first one is molded it welds to a previously molded section at an edge thereof, and the sections are advanced after each molding step so that a trailing edge of the last molded section seals the mold exit. The trailing edge may be provided with a thin flange which is softened by the molten material so that a weld is formed. Shrinkage of the plastic is controlled to prevent leakage of molten plastic from the mold around the last molded section and also to prevent buckling of the sheet. This is preferably done by providing keys in the mold which harness the plastic to the mold. Pins in the mold are used to form indentations in the sections to facilitate advancing the sections. Other pins slightly oversize in diameter and length serve as a lock for accurate alignment of the sections and also serve a sealing purpose.

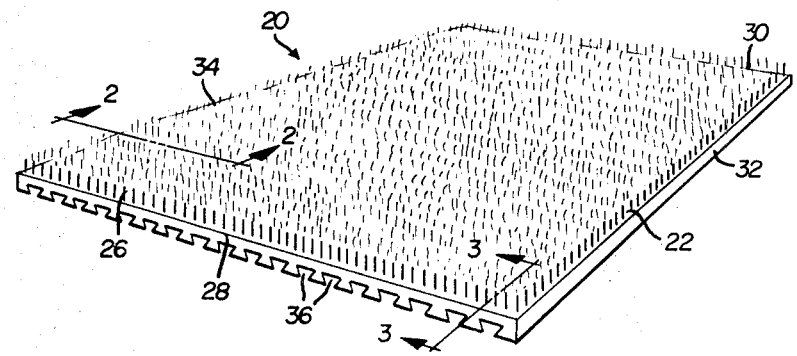
FIG. I
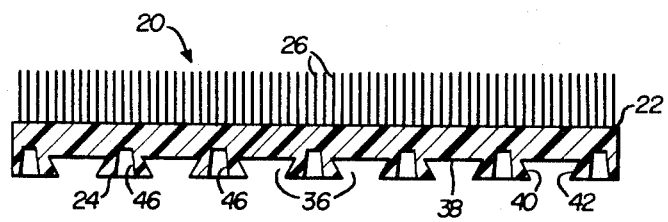
FIG. 2
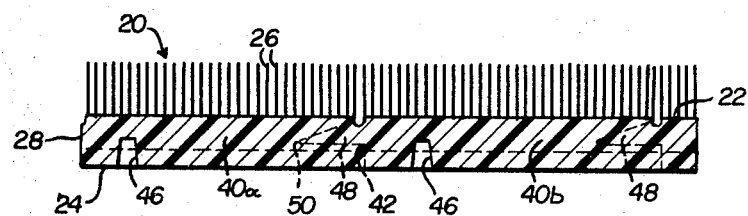
FIG. 3
INVENTORS
ERICH W. GRONEMEYER.
LOUIS F. KUTIK.
BY
SETTLE, BATCHELDER & OLTMAN.
ATT'Y.

INVENTORS
ERICH W. GRONEMEYER.
LOUIS F. KUTIK.
BY
SETTLE, BATCHELDER & OLTMAN.
ATT'Y.

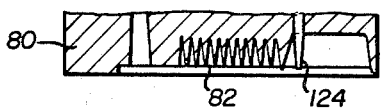
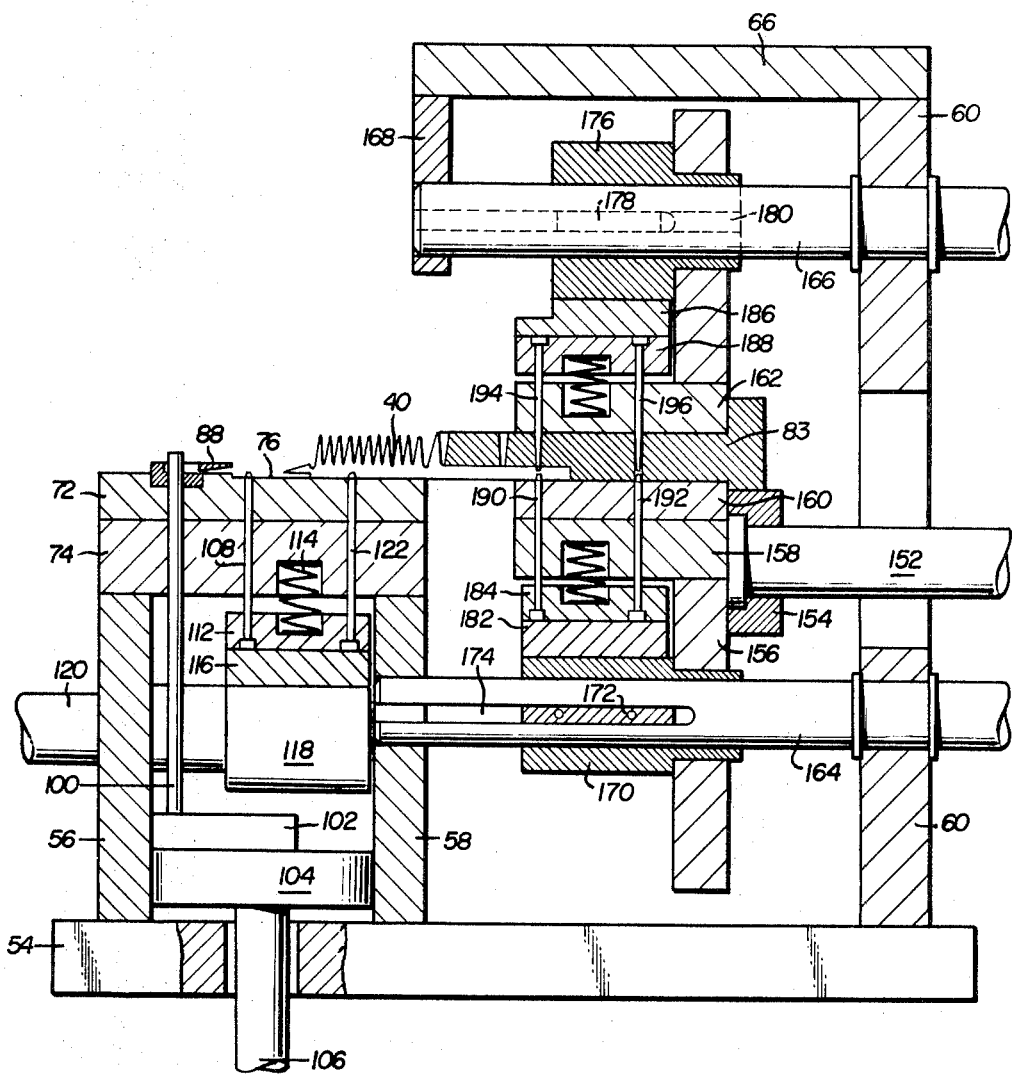
FIG. 7

INVENTORS
ERICH W. GRONEMEYER.
LOUIS F. KUTIK.
BY
SETTLE, BATCHELDER & OLTMAN.
ATT'Y.

INVENTORS
ERICH W. GRONEMEYER.
LOUIS F. KUTIK.
BY SETTLE, BATCHELDER & OLTMAN.

ATT'Y.

INVENTORS
ERICH W. GRONEMEYER.
LOUIS F. KUTIK.

BY

SETTLE, BATCHELDER & OLTMAN.

ATT'Y.

PROGRESSIVE INJECTION MOLDED SHEET AND METHOD OF AND APPARATUS FOR MAKING THE SAME

BACKGROUND OF THE INVENTION

The invention is concerned with plastic sheets, and particularly sheets which may be molded with integral bristles such that they may be used for rugs or carpets. On the other hand, sheets without bristles may be used as panels and could be provided with appropriate decoration.

It would be extremely difficult and expensive to injection mold a large plastic sheet with or without bristles in a single molding step. Obviously, a mold as large as the product would be required, and in the case of sheets for use as rugs or carpets, the mold cavity would have to be very large in area. Not only would such a mold be expensive, but extreme holding forces would be required. Difficulties would also be encountered in filling the mold with plastic, partly because molten plastic becomes chilled as it enters the cavity and solidifies, thus tending to block access to some portions of the cavity.

The present invention contemplates injection molding of sections of a sheet and joining the sections together as they are molded. Some special problems are encountered in this process, but they have been overcome satisfactorily. For example, provisions must be made to assure that a newly molded section will adhere or join to the last previously molded section. Problems are also encountered because of shrinkage of the plastic. Specifically, a previously molded section must seal the mold cavity, but undue shrinkage of that section could allow molten material to leak out of the cavity. Such shrinkage could also cause steps to form at the side edges of the sheet and could cause buckling of the sections.

SUMMARY OF THE INVENTION

The invention provides a plastic sheet made up of sections which are progressively injection molded and joined together, preferably by welding or fusing of the plastic at the joints. The sections may be square or rectangular, the rectangular form being preferred because very wide rectangular sections may be molded and joined together along their long edges to build up a large sheet. Bristles may be formed as integral parts of the sheets where they are to be used as carpeting.

To assure that the newly molded section will weld to the last previously molded section, the trailing edge of each section is provided with a very thin flange or extension having a large surface area and reduced thickness, which is softened by the molten plastic, thus causing the next-molded section to weld to the flange during the molding operation. There must be some way to advance the sections as they are molded, and pins are provided for this purpose in accordance with the invention.

When a large newly molded section cools, it unavoidably shrinks greatly. Depending on size, such shrinkage will range from a fraction of an inch to an inch or more. It can be seen that where the newly molded section joins the previously molded section, this shrinkage could cause buckling of the previously molded section. Also, the previously molded section is sealed in the mold cavity by, in effect, utilizing the previously molded section to form one side of the mold. If the previously molded section has shrunk too much, there will be a gap between this section and the mold through which molten plastic can escape from the mold.

These thermal shrinkage problems have been solved by harnessing the plastic material to the mold to control shrinkage. The harnessing is preferably done by providing keys in the die or the mold as will be explained. These keys prevent undesirable shrinkage over the width of a section so that no large gaps will form at the side edges of the section through which molten plastic can escape from the mold. The shrinkage which occurs over the length of the section is not harmful. Because shrinkage is controlled in the manner just described, no buckling or misalignment of the sections occurs.

Accordingly, it is an object of the present invention to provide a plastic sheet which is molded by progressive injection molding.

Another object of the invention is to provide a plastic sheet comprising progressively injection molded sections welded or fused together at edges thereof.

A further object of the invention is to provide a flange at an edge of each section in a progressively injection molded plastic sheet (except one section), with the flange extending into an adjoining section and being welded or fused thereto.

Another object of the invention is to provide a progressively injection molded plastic sheet with undercut slots which, in the use of the sheet, can be filled with adhesive material to secure the sheet to a mounting surface such as a floor by an interlocking connection, even though the adhesive does not wet the plastic.

Another object of the invention is to provide a method of molding a plastic sheet by successively molding plastic sheet sections and simultaneously joining each such newly molded section to the last previously molded section.

A further object of the invention is to mold a very thin flange at the trailing edge of each plastic section in the method just described, so that the molten material injected to form a given section will soften the flange of the last previously molded section and will fuse thereto, thus joining the sections.

Still another object is to provide a method of and apparatus for progressive injection molding in which one set of pins are used in the mold to form indentations in each section, and other pins slightly oversize in diameter and length are inserted into the indentations, so as to serve as a lock for accurate alignment of the sections and also to serve a sealing purpose.

Yet another object of the invention is to provide a method of and apparatus for progressive injection molding in which shrinkage of a previously molded section (which can be very undesirable) is substantially prevented across the width dimension of the section by harnessing the section to the mold with longitudinally extending keys.

Other objects of this invention will appear in the following description and appended claims, reference being had to the accompanying drawings forming a part of this specification wherein like reference characters designate corresponding parts in the several views.

ON THE DRAWINGS

FIG. 1 is a perspective view of a progressive injection molded sheet having integral bristles on the upper side thereof;

FIG. 2 is a fragmentary sectional view of the sheet taken along line 2—2 of FIG. 1;

FIG. 3 is a fragmentary sectional view of the sheet taken along line 3—3 of FIG. 1;

FIG. 7 is a vertical sectional view of the apparatus at a stage where a section of a sheet has been advanced;

Figure 4:
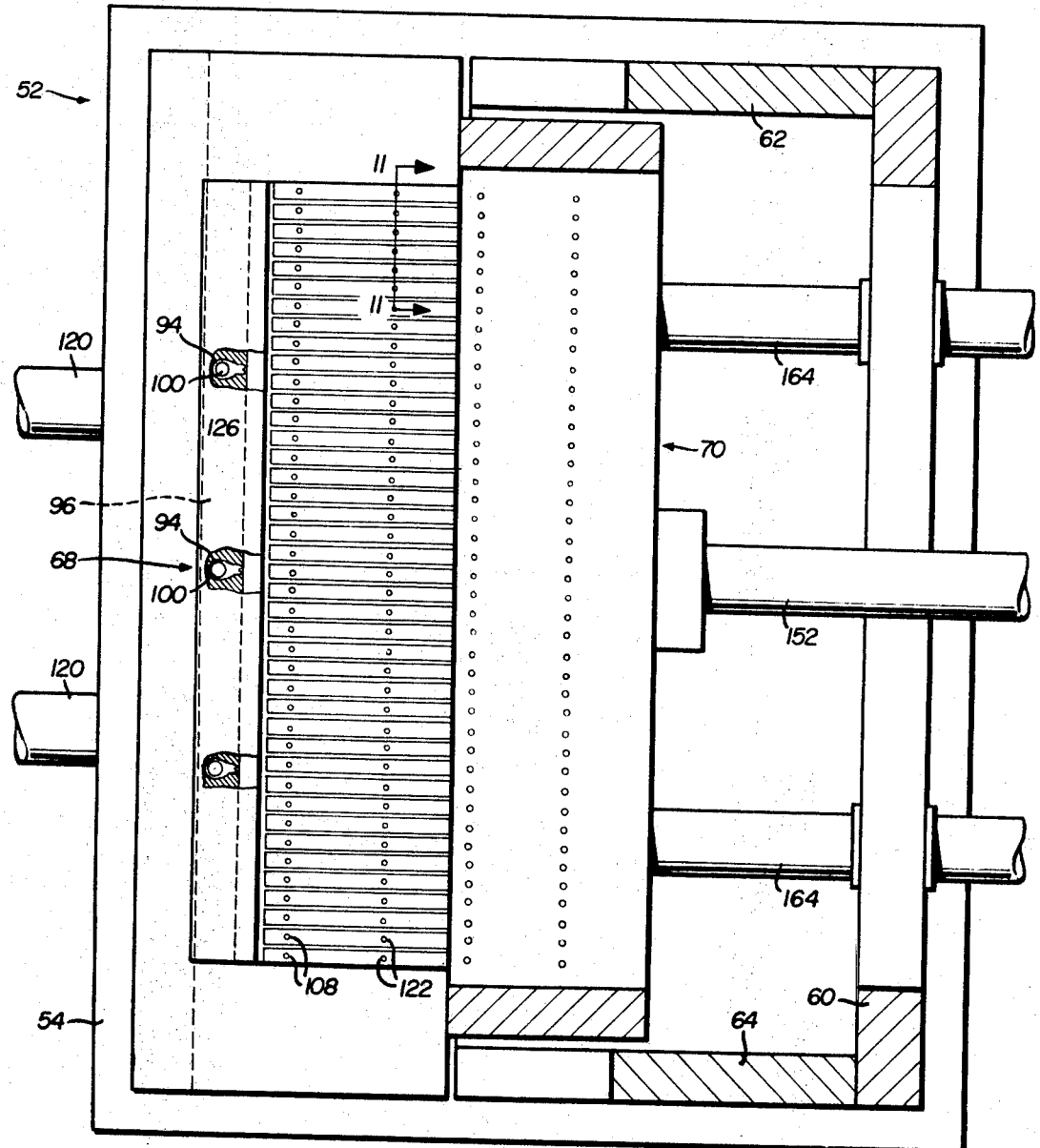
FIG. 4 is a plan view, partly in section, showing the lower part of a mold and associated advancing apparatus for molding the sheet of FIG. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

AS SHOWN OF THE DRAWINGS

THE MOLDED PRODUCT

Referring first to FIGS. 1, 2 and 3, a progressive injection molded plastic sheet 20 is shown, the sheet being homogeneous and having upper and power major surfaces 22 and 24 with monofilament bristles 26 extending from and integral with upper surface 22. One use for the sheet 20 is as carpeting, and for a sheet of this type the bristles 26 are made to be hairlike, i.e., they are very fine and provide a nap on the sheet 20. It is to be understood that progressive injection molded sheets in accordance with the invention need not have bristles on them for some applications. For example, where the sheet is to be used as paneling, it may be planar or may have a design molded into surface 22. The sheet may be made in various colors.

For purposes of identification, the dimension of the sheet between edges 28 and 30 will be referred to as the length of the sheet, and the dimension between edges 32 and 34 will be referred to as the width of the sheet. Consequently, edges 28 and 30 are the end edges, and edges 32 and 34 are the side edges. The edges and dimensions of individiual sections of the sheet will be identified similarly.

The bottom or backing surface 24 of the sheet is provided with continuous undercut or re-entrant recesses or slots 36 which extend the full length of the sheet between end edges 28 and 30. Slots 36 have recessed base surfaces 38 and slanting side surfaces 40 and 42. It is apparent that the slots taper from a narrow dimension at surface 24 to a wider dimension at surface 38.

Sheet 20 is made up of a plurality of plastic sections 40, two such sections 40a and 40b being shown in FIG. 3. Each section extends over the full width of the sheet 20. Sections 40a and 40b are welded or fused together at a joint 42 which is at the trailing edge of section 40b and the leading edge of section 40a. For purposes of identification, the length of a section such as 40a will be considered to be the dimension between edge 28 and joint 42, the width of the section being the same as the width of sheet 20. Ordinarily, the width of each section will be considerably greater than its length because in this way large sheets can be built up. However, it is contemplated that the sections may be square for some applications.

The bottom or backing side 24 of each section is provided with at least one row of indentations 46, these indentations being aligned across the width of the section as shown in FIG. 2. Indentations 46 are formed by one set of pins when a given section is molded, and thereafter they receive other pins which serve to lock the sections in place while a new section is molded and also to advance the sections as will be described further.

As shown in FIG. 3 the trailing edge of section 40b has a thin flange 48 extending therefrom into section 40a. The material of section 40a is welded or fused to the material of flange 48, and this welding or fusing takes place as a given section is molded. The joining together of sections will be described more fully when the method subject matter of the invention is considered later, but it may be noted at this point that flange 48 is very thin and tapers to a sharp edge at 50 to that it can be softened readily by hot molten plastic to facilitate joining. The trailing edge of section 40a XXhas a flange at the time it is molded, but this flange is removed to provide one edge 28 of the sheet. All of the other sections of the sheet have a flange 48 embedded in and welded to an adjoining section.

Polyethylene is one suitable material for the sheet, but others may be used.

The sheet 20 may be made sufficiently thin and flexible to allow it to be rolled up for shipment and storage purposes. The slots 36 serve move than one purpose, and one of these purposes is connected with anchoring sheet 20 to a mounting surface such as a floor. Slots 36 may be filled with adhesive which will be exposed at surface 24 and will adhere to the floor. The adhesive need not bond to the plastic of sheet 20 because the undercut nature of recesses 36 means that the adhesive, after it hardens, forms an interlocking connection to the sheet which will hold it in place.

THE INJECTION MOLD

Figure 5:
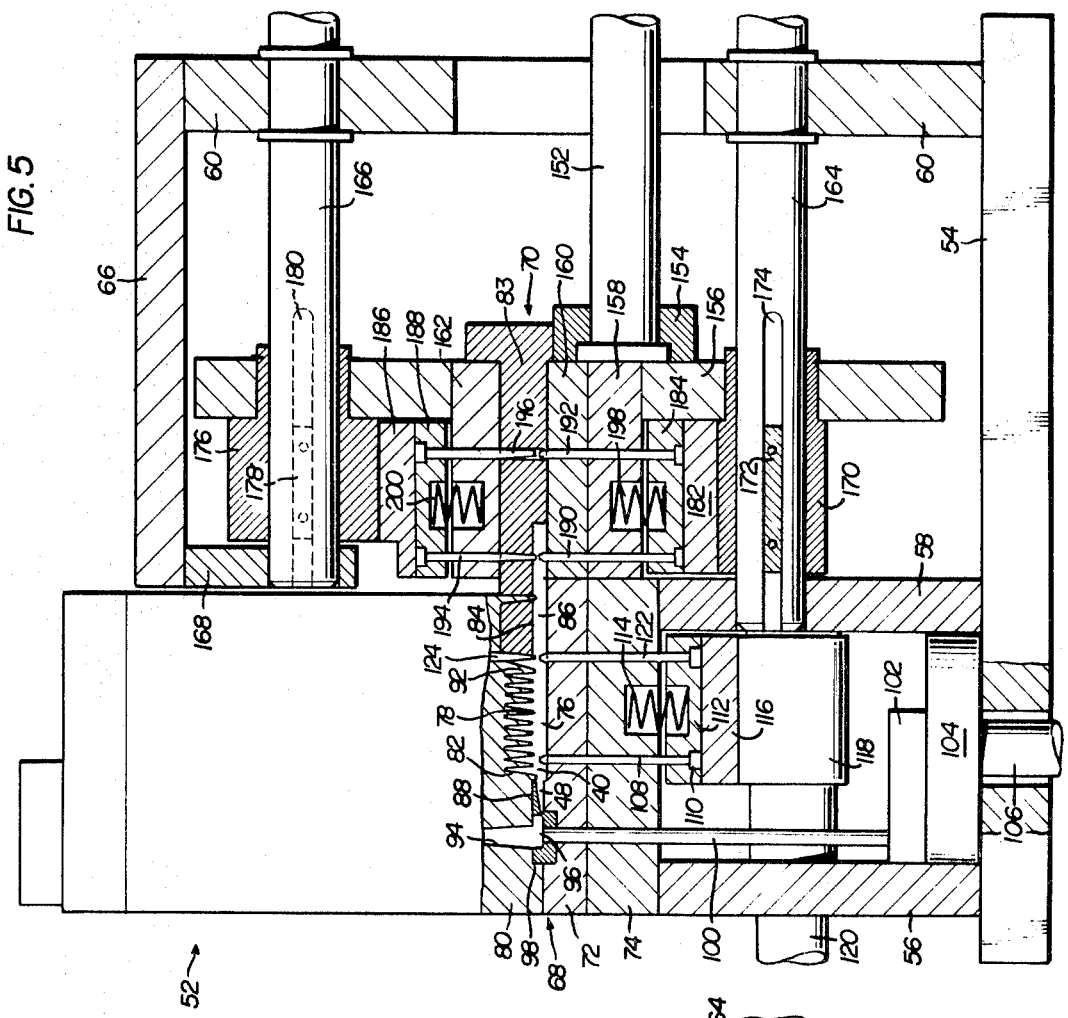
FIG. 5 is a vertical sectional view of the apparatus of FIG. 4 at a stage where a section of a sheet has been molded.

FIGS. 4–9 illustrate one embodiment of apparatus for molding the sheet 20 by progressive injection molding, and also illustrate the steps of the method of progressive injection molding. Referring first to FIGS. 4 and 5, the apparatus 52 includes a base plate 54 on which vertical support walls 56, 58 and 60 are mounted. Sidewalls 62 and 64 are connected to wall 60 (FIG. 4), and a top wall 66 is connected to vertical wall 60.

The apparatus includes two main sections, a mold section designated generally 68 and a puller section designated generally 70. Mold section 68 includes superposed plates 72 and 74 mounted in stationary positions on top of vertical walls 56 and 58. The upper surface 76 of plate 72 is shaped to form the bottom of the mold cavity 78. Above plate 72 is a vertically movable plate 80 which has a lower surface 82 shaped to form another boundary of the mold cavity 78. It may be noted that recesses are shown in plate 80 for forming bristles on plastic sections as they are molded, but the size of these recesses is greatly exaggerated because it would be impossible to show recesses as fine as those actually used. The upper mold member 80 is preferably a plurality of blades joined together in the manner described and claimed in U.S. Pat. No. 3,357,058 of Louis F. Kutik, one of the present inventors, to form a mold for molding bristles on a sheet. The drawings have been simplified in the present application by showing only crude and enlarged bristle forming cavities.

An adapter 83 is recessed at 84 for the purpose of molding an extension 86 on the first plastic section which is molded to enable that section to be advanced from the mold. The adapter 83 is removed from the apparatus at a later stage of the method as will be described.

Figure 10:
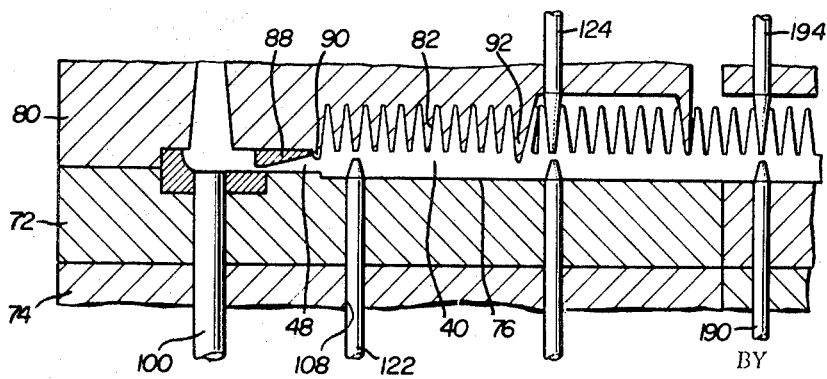
FIG. 10 is an enlarged view of a portion of the apparatus of FIG. 9.

A small wedge-shaped strip 88 is mounted on the upper side of mold member 72 to define the tapered flange 48 on the trailing edge of each plastic section. There is also a small projecting ridge 90, shown more clearly in FIG. 10, which molds a recess at the base of projection 48 for receiving a sealing projection 92 after the plastic section has been advanced. The mold cavity 78 for molding a plastic section effectively terminates at projection 92, except that when the first plastic section is being molded as in FIG. 5, the cavity 76 is extended by the adapter 84 to form the extension 86 on the first plastic section.

Hot plasticized plastic material is injected under pressure into cavity 76 from a passageway 94 extending through mold member 80 and structure provided above it, and in FIG. 4 three such passageways 94 are indicated. Three gates 96 communicate respectively with passageways 94 and the mold cavity 76. Gates 96 may be defined by inserts 98. The gates are spaced along the width of mold cavity 76 closely enough that the hot plasticized plastic material injected into the cavity through the gates will not solidify completely before the cavity is filled. Directly under passageways 94 are vertically movable stripper rods 100 which extend through plates 72 and 74 and are connected at their lower ends to vertically movable bars 102 and 104. Bars 102 and 104 may be raised by operation of an external pneumatic or hydraulic cylinder connected to the bars by a piston 106. The stripper rods 100 are shown in their lowered positions in FIG. 5.

Extending vertically through plates 72 and 74 are a first set of molding pins 108. These molding pins are movable vertically, and are shown in a raised position in FIG. 5 wherein the tips of the pins project into mold cavity 76. The pins 108 mold the indentations 46 (FIGS. 2 and 3) into each plastic section. The lower ends of pins 108 have heads 110 which lock into recesses in a pin bar 112 which is urged downwardly by springs 114 provided between bar 112 and plate 74 as shown in FIG. 5. Another bar 116 is connected to bar 112 and bears against cams 118 provided on shafts 120 extending horizontally outward from the apparatus 52. Bars 112 and 116 along with pins 108 are shown in a raised position in FIG. 5. By rotating shafts 120, cams 118 are turned until a flat or low point thereof is in contact with plate 116, thereby lowering bars 112 and 116 along with pins pins 108 to remove the tips of pins 108 from the mold cavity and from the molded indentations 46.

A second set of pins 122, hereinafter referred to as "locking pins," extends vertically through plates 72 and 74, and their lower ends are also connected to pin bar 112. Thus, when bars 112 and 116 are raised or lowered, the second set of pins 112 are also raised or lowered as the case may be. The purpose of pins 112 is to extend into the indentations 46 in a previously molded section to lock that section in place with its trailing edge blocking or sealing the exit end of the mold cavity 76. The locking pins 112 are aided in this function by the locating projection 92 (FIG. 10) and also by upper pins 124 which project downwardly from mold member 80 directly opposite pins 122. Thus, both pins 122 and 124 engage a previously molded section to lock it in place. However, at the stage shown in FIG. 5, an extension 86 is being molded on the first section, so the pins 122 mold indentations into the extension.

The locking pins 122 may be slightly longer and larger in diameter than the molding pins 108, so that pins 122 slightly expand the plastic material about them to help insure that the plastic material firmly contacts the adjoining metal surfaces to prevent escape of molten materials from the mold cavities 76. This will be more apparent from FIG. 8.

Figure 11:
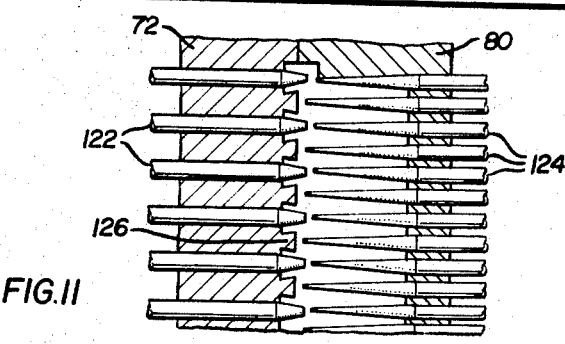
FIG. 11 is a fragmentary sectional view taken along line 11—11 of FIG. 4.
Figure 15:
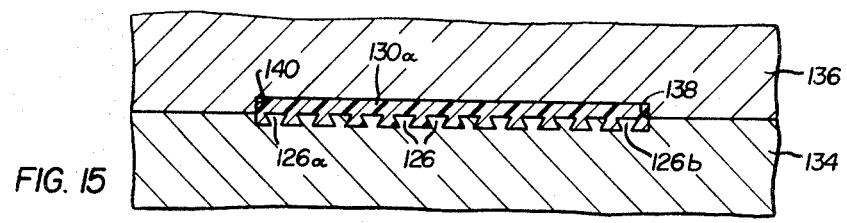
FIG. 15 is a fragmentary sectional view taken along line 15—15 of FIG. 13 illustrating how the width dimension of a plastic section can be maintained to avoid gaps like those shown in FIG. 14 by harnessing the plastic to the mold.

The surface 76 of mold member 72 is provided with a plurality of longitudinally extending keys 126 which are visible most clearly in FIGS. 11 and 15. These keys are undercut so that they have the cross-sectional shape of the recesses 36 discussed in connection with FIG. 2, and of course the keys 126 mold the recesses 36 into the plastic sheet. It may be noted that keys 126 extend longitudinally all the way through mold cavity 78 and well beyond the mold cavity to a terminal edge at 128 shown in FIG. 4. Thus, in addition to molding the recesses 36 into a newly molded section, the keys serve to anchor a previously molded section in alignment with the newly molded section. The keys 126 interlock with the plastic material because of the undercutting thereof so that they hold down a newly molded section when the upper mold member 80 is moved vertically as in FIG. 6, thus pulling the bristles out of the bristle molding cavities 82.

Figures 12, 13:
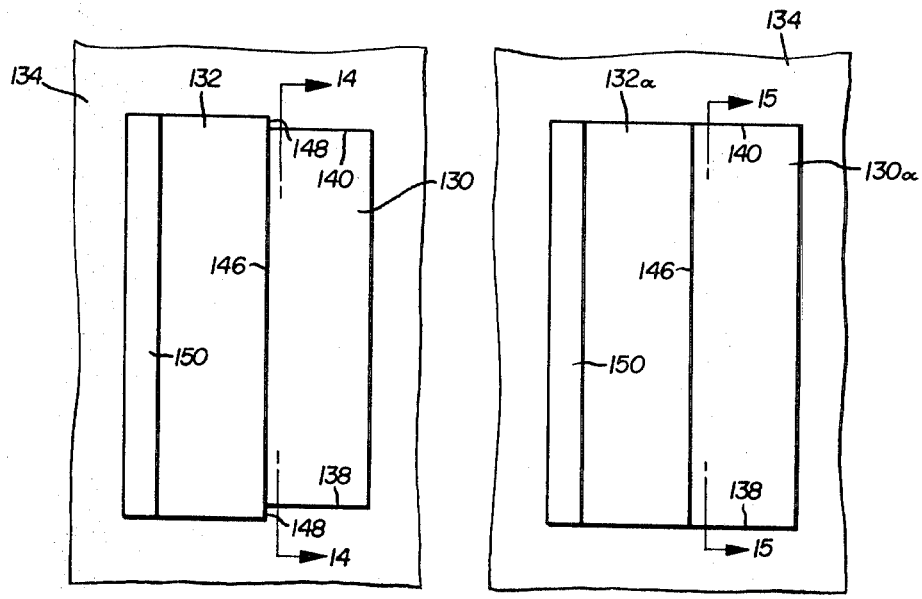
FIG. 12 is a schematic plan view of a newly molded plastic section joined to a previously molded section illustrating how undesirably shrinkage of the previously molded section causes irregular or stepped side edges to form on a sheet, the shrinkage also leading to buckling of the sheet.
FIG. 13 is a schematic plan view illustrating a newly molded section joined to a previously molded section where undesirable shrinkage has been prevented.
Figure 14:
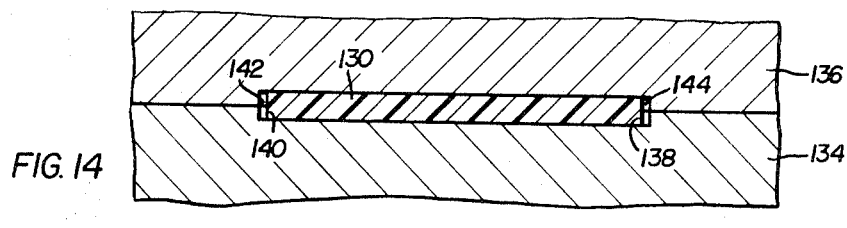
FIG. 14 is a fragmentary sectional view taken along line 14—14 of FIG. 12 showing gaps between the side edges of the section and the mold through which molten plastic can leak.

The keys 126 serve another very important function which will be described with reference to FIGS. 12-15. These figures are somewhat schematic since they are intended to illustrate only how the keys 126 prevent undesirable shrinkage of the plastic material. In FIG. 12, there is shown a previously molded plastic section 130 and a newly molded plastic section 132 in a mold member 134 as they would appear immediately after molding the section 132, assuming that no keys or other retention means are provided to prevent shrinkage across the width of the sections. The previously molded section 12 shrank considerably across its width between edges 138 and 140. Consequently, as shown in FIG. 14 there are gaps 142 and 144 between side edges 138 and 140 and the adjoining edges of the mold. Previously molded section 130 actually forms one sidewall of the mold cavity in which section 132 is molded. Thus, when molten plastic is injected under high pressure into the mold cavity, it can escape from the cavity through gaps 142 and 144. The shrinkage will be between 0.008 and 0.015 inch per of material, and thus it is apparent that the gaps 142 and 144 may be quite large depending on how wide section 130 is. If gaps 142 and 144 are larger than about 0.002 inch, molten plastic can easily extrude from the mold cavity through these gaps.

Another problem caused by such shrinkage is apparent from FIG. 12. It may be seen that where section 132 joins section 130 along edge or joint 146 steps are formed at 148. These steps make irregular side edges on the sheet, and are undesirable for this reason alone. It addition, as newly molded section 132 shrinks, tension will be exerted along joint 136 which may cause previously molded section 130 to buckle.

FIGS. 13 and 15 illustrate the results which are achieved when keys 126 are provided on the bottom mold 134 to prevent undesirable shrinkage of the plastic material across the width of a section. These keys harness the plastic material to the mold to maintain the desired width dimension between edges 138 and 140. Shrinkage in width occurs mainly between each pair of keys. The only shrinkage of edges 138 and 140 is due to the material between the sides of the mold and the first adjacent keys 126a and 126b. If this dimension is less than say ⅛ of an inch, the width shrinkage will be negligible, and no molten plastic material can escape from the molds. The thickness of the sheet is always very small, so that shrinkage across this dimension is also negligible. Shrinkage across the length of a section, i.e. between edges 150 and 146 is not harmful since it does not break the seal of the mold and does not effect the adjoining section.

As result of the effect of the keys 126, sections 130a and 132a have the same width as shown in FIG. 13, and there are no irregular side edges or steps.

THE PULLING APPARATUS

Referring again to FIGS. 5-9, the pulling apparatus 70 will now be described. An actuating rod 152 is attached by a coupling member 154 to a vertical support plate 156. Horizontal plates 158, 160 and 162 are attached to vertical plate 156, and the adapter 83 fits between plates 160 and 162. Lower shafts 164 are journaled for rotation in plates 58 and 156, and upper shafts 166 are journaled for rotation in plates 60 and 168.

Cams 170 are slidably keyed to shafts 164 by keys 172 fitting in slots 174. Similar cams 176 are slidably keyed to upper shafts 166 by keys 178 fitting in slots 180. The lower cams 170 engage one of two pin bars 182 and 184, and the upper cams 176 engage the upper one of two pin bars 186 and 188.

The lower sets of pins 190 and 192 extend through plates 158 and 160, and have heads engaging pin bar 184 so that they they will move vertically with pin bar 184. Similarly, two upper sets of pins 194 and 196 extend through plate 162 and adapter 82, and have heads engaged by pin bar 188 so that the pins will move vertically with the pin bar. Pins 190, 192, 194 and 196 are shown in FIG. 5 in a closed position. Pins 190 and 192 are moved down by rotating shafts 164, and pins 194 and 196 are moved up by rotating shafts 166. This movement of the pins is produced by springs 198 and 200 which respectively bias pin bars 184 and 188 so that these pin bars follow the cams 170 and 176 when they are rotated to a flat or low point.

Figure 8:
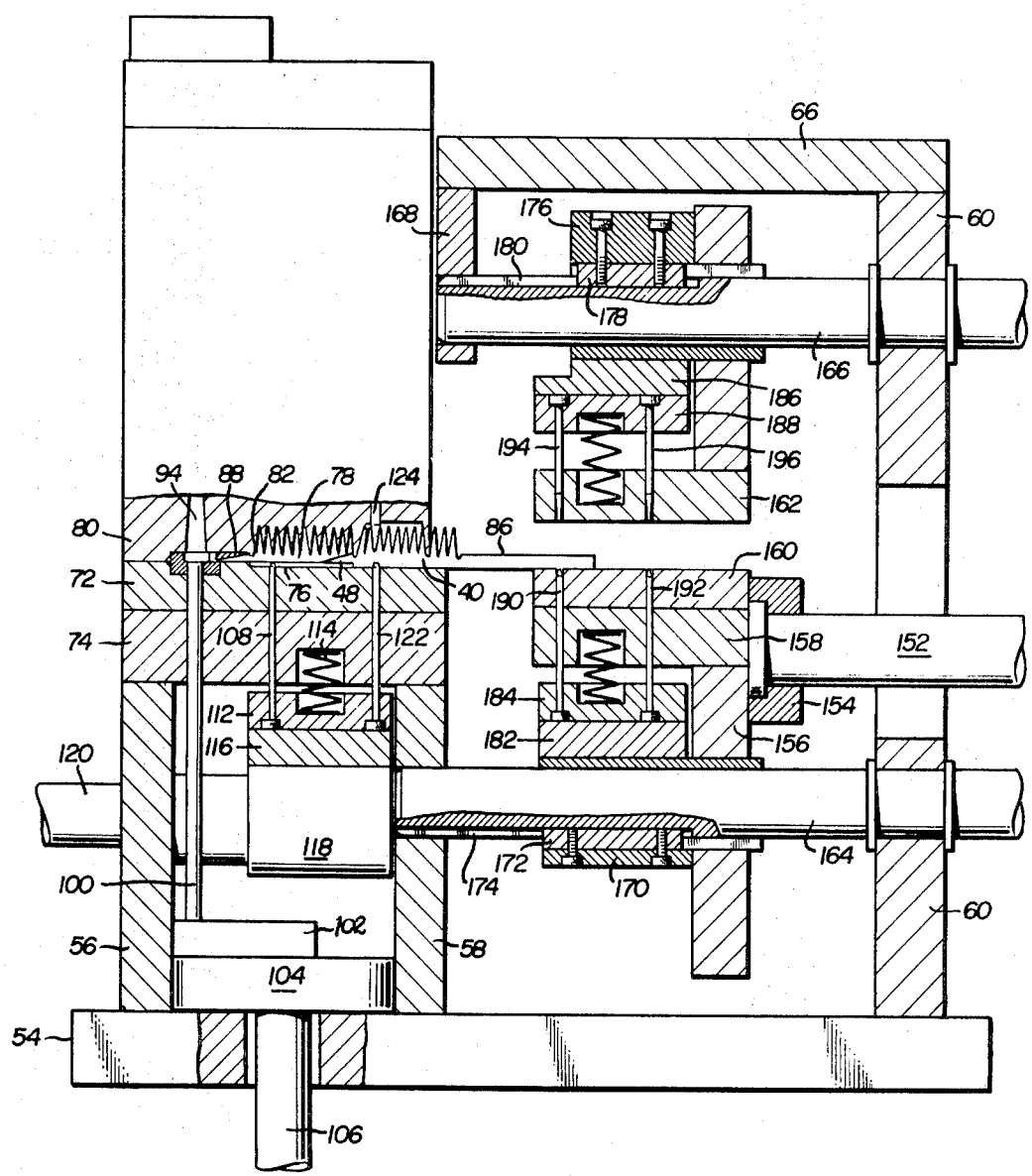
FIG. 8 is a vertical sectional view of the apparatus after the mold has been closed and a starting adapter has been removed.
Figure 9:
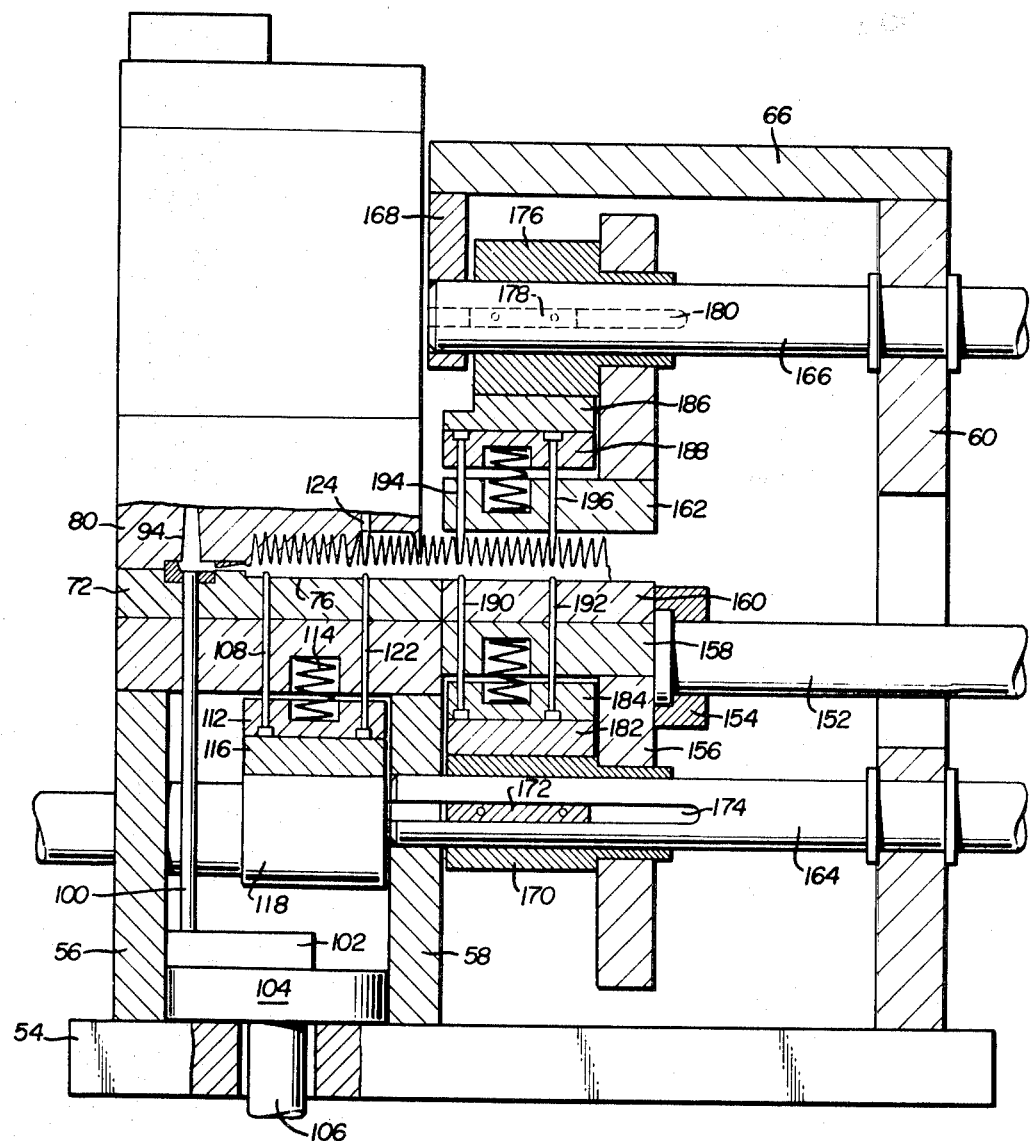
FIG. 9 is a vertical sectional view of the apparatus after several sections of a sheet have been progressively injection molded and welded together during the molding.

The whole pulling mechanism 70 is movable horizontally along shafts 164 and 166 when shaft 152 is pulled to the right and the mold is open to expose the molded product, as viewed in FIG. 7. Since pins 190, 192, 194 and 196 grip the plastic sheet which has been molded, this movement of pulling mechanism 70 advances the sheet to pull the newly molded section out of the mold leaving only its trailing edge at the exit end of the mold cavity to seal the mold when it is closed. After the mold is reclosed as in FIG. 8, the shafts 164, 166 are rotated to open the pulling mechanism, the rod 152 is extended to the left, the pulling mechanism is advanced to the mold and reclosed, as best shown in FIG. 9.

THE METHOD

The steps of the method will be described starting with the apparatus 52 positioned as shown in FIG. 5. Molten plastic is injected through passageways 94 and gate 96 into the mold cavity 78 under very high pressure. The plastic material fills the bristle forming cavities 82 and also the extension 84 of the mold cavity formed by the adapter 83. A flange 48 is formed on the trailing edge of the newly molded section 40. Indentations 46 are molded by pins 108 and slots 36 are molded by keys 126.

Figure 6:
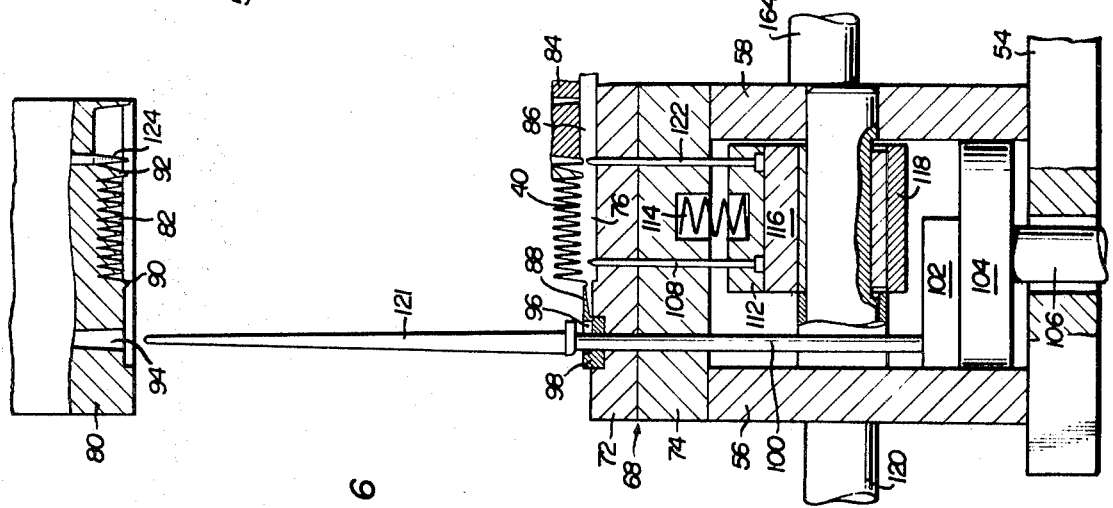
FIG. 6 is a fragmentary sectional view of a portion of the apparatus shown in FIG. 5 at a stage where the mold is open.

After the plastic has solidified, the upper mold member 80 is raised in the manner shown in FIG. 6. Shafts 120 are rotated to pull pins 108 and 122 out of the mold cavity. Rod 106 is raised to, in turn, raise rods 100 and thus push the waste plastic material 121 out of gate 96. The waste material then can be removed, either manually or mechanically.

Next, pulling mechanism 70 is moved to the right to the position shown in FIG. 7 by pulling on the shaft 152. This advances newly molded section 40 to the right through a stroke such that the indentations 46 formed in this section register with pins 122.

Rod 106 is lowered to pull rods 100 down out of the gate 96. Upper mold member 80 is lowered down on to mold member 72 to reform the mold cavity 78, as shown in FIG. 8. It may be noted that the trailing edge of sheet section 40 fills the exit end of the mold cavity 78 with flange 48 projecting into the mold cavity. Pins 108 and 122 are raised by rotating shafts 120, and pins 122 enter the indentations 46 in section 40. The opposed pins 124 engage plastic section 40 on its upper side directly opposite pins 122, and these two sets of pins lock plastic section 40 in place. The relationship of these pins is also shown enlarged in FIG. 11. The projection 92 fits in the small recess at the base of flange 48 to further lock section 40 in place and also to aid in sealing section 40 at the exit end of cavity 78. As previously pointed out, pins 122 are slightly larger in length and diameter than pins 108 so that pins 122 expand the plastic slightly forcing it against keys 126 to further help in sealing the exit end of the mold cavity.

Also as shown in FIG. 8, shafts 164 and 166 are rotated to pull pins 190, 192, 194 and 196 back to release extension 86. The pulling mechanism 70 is then pushed to the left to bring it back to the position shown in FIG. 5 except that the pins of this mechanism will then be registered with different sets of indentations in extension 86.

The apparatus is then ready for another injection step. It may be noted from FIG. 8 that the flange 48 is located centrally between top and bottom surfaces of cavity 78. The reason for this is that when molten material is injected into the cavity, the hot material is at the center of the cavity, the outer material being chilled by the mold walls. Thus, the hottest material softens the flange 48 and welds or fuses to it. Flange 48 is sufficiently thin that heat transferred to it from the molten material raises its temperature substantially without all of the heat being dissipated immediately to the thicker material in the main part of sheet section 40. This facilitates softening of flange 48.

FIG. 9 shows the condition of the apparatus after several plastic sections have been molded progressively and welded together to form a sheet. A portion of this sheet is shown enlarged in FIG. 10 to better show the relationship of the parts.

It may be noted in FIG. 9 that pins 190 and 192 enter indentations 46 in previously molded sections and pins 194 and 196 contact these sections opposite pins 190 and 192 so that the sheet can be advanced by pulling the whole pulling mechanism 70 to the right.

From the foregoing description it is apparent that the invention provides a progessive injection molded sheet which is useful as carpeting, paneling or in other applications. The invention also provides a method of and apparatus for manufacturing the sheet by progressive injection molding of plastic material, and the method has several features which overcome problems and make the method successful.

Figure 16:
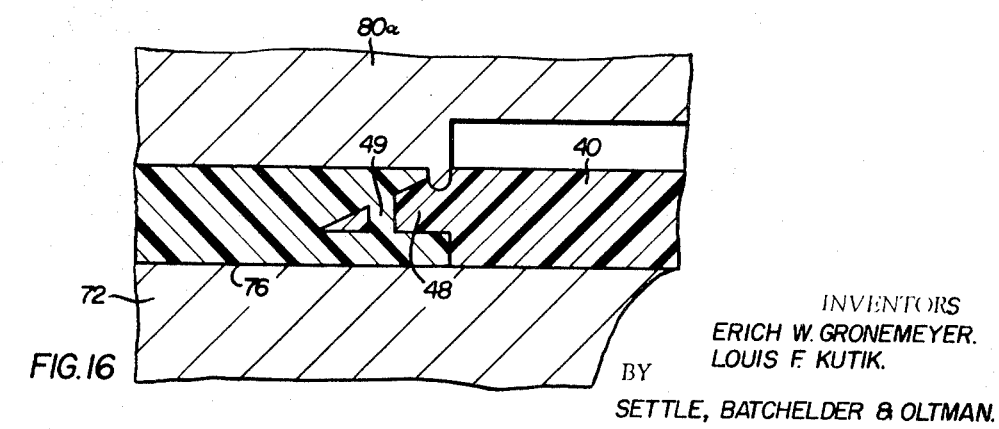
FIG. 16 is a fragmentary sectional view illustrating a joint between two progressive injection molded sections.

FIG. 16 shows a modification of the flange 48. The flange is molded with apertures extending through it, and this can be accomplished by providing suitable pins on the mold such as on wedge-shaped plate 88. When the newly molded section 40 is advanced, it is then in a position shown in FIG. 16. When molten plastic material is injected into the mold cavity, it enters the opening in flange 48 from both sides and thus forms continuous stitches 49 extending through the openings in flange 48. The hot plastic also welds to flange 48, and the stitches 49 provide a further anchoring of the new material to flange 48.

Having thus described our invention, we claim:

1. A plastic product comprising a thin plastic sheet made up of a plurality of plastic sections joined together at edges thereof, each section extending the full width of the sheet, and each section except the two end sections being fused to two adjoining sections with the two end sections being fused to one adjoining section, each of said sections, except one of said end sections, having a flange thinner than said section extending from one edge thereof centrally into an adjoining section and fused thereto, each of said flanges having a plurality of openings extending through the same and each adjoining section including material molded through said openings from both sides thereof, thus providing a mechanical connection between sections augmenting the fused joints.

2. A plastic product comprising a thin plastic sheet made up of a plurality of homogeneous plastic sections joined together at edges thereof, each section extending the full width of the sheet, and each section except the two end sections being fused to two adjoining sections with the two end sections being fused to one adjoining section, each of said sections, except one of said sections, having a flange thinner than said section extending from one edge thereof into a central recess in an adjoining section between the major faces thereof and fused thereto, each of said flanges having a plurality of openings extending through the same, and each adjoining section including material molded through said openings from both sides thereof, thus providing a mechanical connection between sections augmenting the fused joints.

3. The plastic product as claimed in claim 2 in which one side of said sheet has a plurality of bristles integral with a surface of said sheet.

4. The plastic product as claimed in claim 2 in which one side of said sheet has a plurality of undercut slots extending over the length of the sheet.

5. A plastic product comprising a thin plastic sheet composed of plastic sections with each of said sections, except one, having a thin flange extending into a recess at the edge of the next adjoining section and fused thereto, so that said sections are joined to form said sheet, one side of said sheet having a plurality of bristles integral with a surface of said sheet, and the opposite side of said sheet having a surface with a plurality of slots molded therein extending the full length of said sheet, said slots being undercut and accessible to receive adhesive material for affixing said sheet to a mounting surface by an interlocking connection, each of said flanges having an opening therein, and each adjoining section including material molded into said opening to provide a mechanical connection between sections.

6. A plastic product comprising a thin plastic sheet made up of a plurality of plastic sections joined together at edges thereof, each of said sections, except one, having a thin flange extending into a recess at the edge of the next adjoining section and fused thereto, so that said sections are joined to form said sheet, each of said flanges having a plurality of openings extending through the same and each adjoining section including material molded into said openings to provide a mechanical connection between sections augmenting the fused joints.

7. The plastic product as claimed in claim 6 in which one side of said sheet has a plurality of bristles integral with a surface of said sheet.

8. The plastic product claimed in claim 6 in which one side of said sheet has a plurality of undercut slots extended over the length of said sheet.